US008743100B2

(12) United States Patent
Tanaka

(10) Patent No.: US 8,743,100 B2
(45) Date of Patent: Jun. 3, 2014

(54) DISPLAY CONTROL APPARATUS

(75) Inventor: Toshio Tanaka, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 141 days.

(21) Appl. No.: 13/359,036

(22) Filed: Jan. 26, 2012

(65) Prior Publication Data

US 2012/0235966 A1 Sep. 20, 2012

(30) Foreign Application Priority Data

Mar. 17, 2011 (JP) ................................ 2011-058623

(51) Int. Cl.
*G06F 3/038* (2013.01)

(52) U.S. Cl.
USPC .......................................................... 345/207

(58) Field of Classification Search
None
See application file for complete search history.

(56) References Cited

U.S. PATENT DOCUMENTS

2009/0289175 A1* 11/2009 Mahowald et al. ........... 250/216

FOREIGN PATENT DOCUMENTS

JP A-2004-133248 4/2004
JP A-2008-041884 2/2008
JP A-2009-276425 11/2009

OTHER PUBLICATIONS

Chinese Office Action issued in Chinese Patent Application No. 201210021474.5 dated Dec. 16, 2013 (w/translation).

* cited by examiner

*Primary Examiner* — Adam R Giesy
(74) *Attorney, Agent, or Firm* — Oliff PLC

(57) ABSTRACT

An image display system includes a light sensor operable to change a detection sensitivity. The light sensor outputs a signal according to an intensity of external light exerting an influence on a screen of a display apparatus and to the detection sensitivity. An illuminance acquisition part of a display control apparatus acquires illuminance by the external light based on the signal output from the light sensor. Moreover, a display adjuster adjusts a displaying state of the display apparatus in accordance with the illuminance by the external light acquired by the illuminance acquisition part. A sensitivity changer periodically alternates between a "low sensitivity" of the detection sensitivity and a "high sensitivity" of the detection sensitivity of the light sensor. Thus, even when changing significantly, the illuminance by the external light can be accurately and speedily acquired.

20 Claims, 14 Drawing Sheets

DISPLAY CONTROL APPARATUS

BACKGROUND OF THE INVENTION

1. Field of the Invention

The invention relates to control relating to display of a display apparatus.

2. Description of the Background Art

When external light is incident on a display of a display apparatus, visibility of the display apparatus may be reduced depending on illuminance by the external light. Therefore, various technologies have been conventionally proposed to adjust a displaying state of the display apparatus in accordance with the illuminance by the external light.

For example, when the external light is dark like at night, a screen of the display apparatus is too bright for a user because the screen is much brighter as compared to surrounding environment, and the visibility of the screen of the display apparatus is reduced. Therefore, a technology that reduces an amount of light (light amount) of a backlight of the display apparatus when the illuminance by the external light is relatively low, in accordance with the low illuminance, and that reduces brightness of the screen of the display apparatus, has been conventionally known.

On the other hand, when incident external light is bright such as when direct sunlight or the like is incident, tones of displayed images are reduced due to, for example, reflection of the incident external light. Thus, the visibility of the screen of the display apparatus is reduced. Therefore, a technology that corrects images to be displayed on the display apparatus and that improves the visibility of the images when the illuminance by the external light is relatively high, has been conventionally known.

When the technology mentioned above or the like that adjusts the displaying state of the display apparatus in accordance with the illuminance by the external light is adopted, it is required to acquire accurate illuminance by the external light. The screen of the display apparatus, such as a vehicle-mounted display apparatus, used at various times of a day at various places is exposed to various types of light, such as a street light and sunlight. Therefore, a light sensor is required to detect a wide range of illuminance from very low illuminance of approximately 5 lx (equivalent to illuminance in a vehicle cabin at night, etc.) to very high illuminance of approximately 100,000 lx (equivalent to illuminance by direct sunlight in a daytime, etc.).

However, when an adopted relatively-low sensitivity light sensor is operable to detect illuminance in a range, for example, from 0 lx to 100,000 lx and indicates a detection result in 8 bits (0 to 255), the sensor cannot accurately detect low illuminance of approximately 5 lx because a resolution is too low. On the other hand, when an adopted relatively-high sensitivity light sensor is operable to detect illuminance in a range, for example, from 0 lx to 100 lx, the sensor cannot accurately detect illuminance exceeding 100 lx because the detection result overflows.

Therefore, a light sensor that is operable to switch detection sensitivities by switching values of resistors connected to a light receiving element has been conventionally proposed. Such a light sensor is operable to detect illuminance in a wide range by switching detection sensitivity modes in accordance with the illuminance detected.

However, when the illuminance by the external light changes significantly, such a light sensor needs to detect the illuminance, to switch detection sensitivity modes based on the illuminance detected and to detect the illuminance again based on a mode to which the detection sensitivity is switched. Thus, the light sensor requires some time to acquire accurate illuminance by the external light. Therefore, in a case where the displaying state of the display apparatus is adjusted based on the detection result of the light sensor, the displaying state of the display apparatus cannot be speedily adjusted responding to significant and frequent changes of the illuminance by the external light (e.g., when a display apparatus installed on a vehicle running at night receives bright light of street lights intermittently). As a result, the visibility of the display apparatus may be reduced.

SUMMARY OF THE INVENTION

According to one aspect of the invention, a display control apparatus controls a display of a display apparatus. The display control apparatus includes: an acquisition part that acquires information about illuminance by external light on a screen of the display apparatus based on a signal output from a detector that outputs the signal according to an intensity of the external light and a detection sensitivity of the detector; an adjuster that adjusts a displaying state of the display apparatus in accordance with the acquired information about the illuminance by the external light; and a sensitivity changer that periodically changes the detection sensitivity of the detector to each of a plurality of set sensitivity modes that are different from one another.

Since the detection sensitivity of the detector is changed periodically to each of the plurality of set sensitivity modes, even when changing significantly, the information about the illuminance by the external light can be acquired accurately and speedily. Thus, the response performance to a change of the illuminance by the external light can be improved in the adjustment of the displaying state of the display apparatus.

According to another aspect of the invention, the sensitivity changer alternates between a relatively low set sensitivity mode of the detection sensitivity and a relatively high set sensitivity mode of the detection sensitivity in one cycle.

The information about the illuminance by the external light can be acquired in the two detection sensitivity modes in the one cycle.

According to another aspect of the invention, the adjuster selectively performs, based on the illuminance by the external light: a first control for a case where the illuminance by the external light is relatively high; and a second control for a case where the illuminance by the external light is relatively low.

When one control to be performed is chosen, based on the illuminance by the external light, from amongst the first control for the case where the illuminance by the external light is relatively high and the second control for the case where the illuminance by the external light is relatively low, the information about the illuminance by the external light can be acquired accurately and speedily. Thus, the control appropriate to and according to the illuminance by the external light can be performed speedily.

Therefore, an object of the invention is to accurately and speedily acquire information about illuminance by the external light even when the illuminance by the external light changes significantly.

These and other objects, features, aspects and advantages of the invention will become more apparent from the following detailed description of the invention when taken in conjunction with the accompanying drawings.

DESCRIPTION OF THE EMBODIMENTS

Embodiments of the invention are hereinafter described with reference to the drawings.

<First Embodiment>

<1-1. Entire Configuration>

Figure 1:
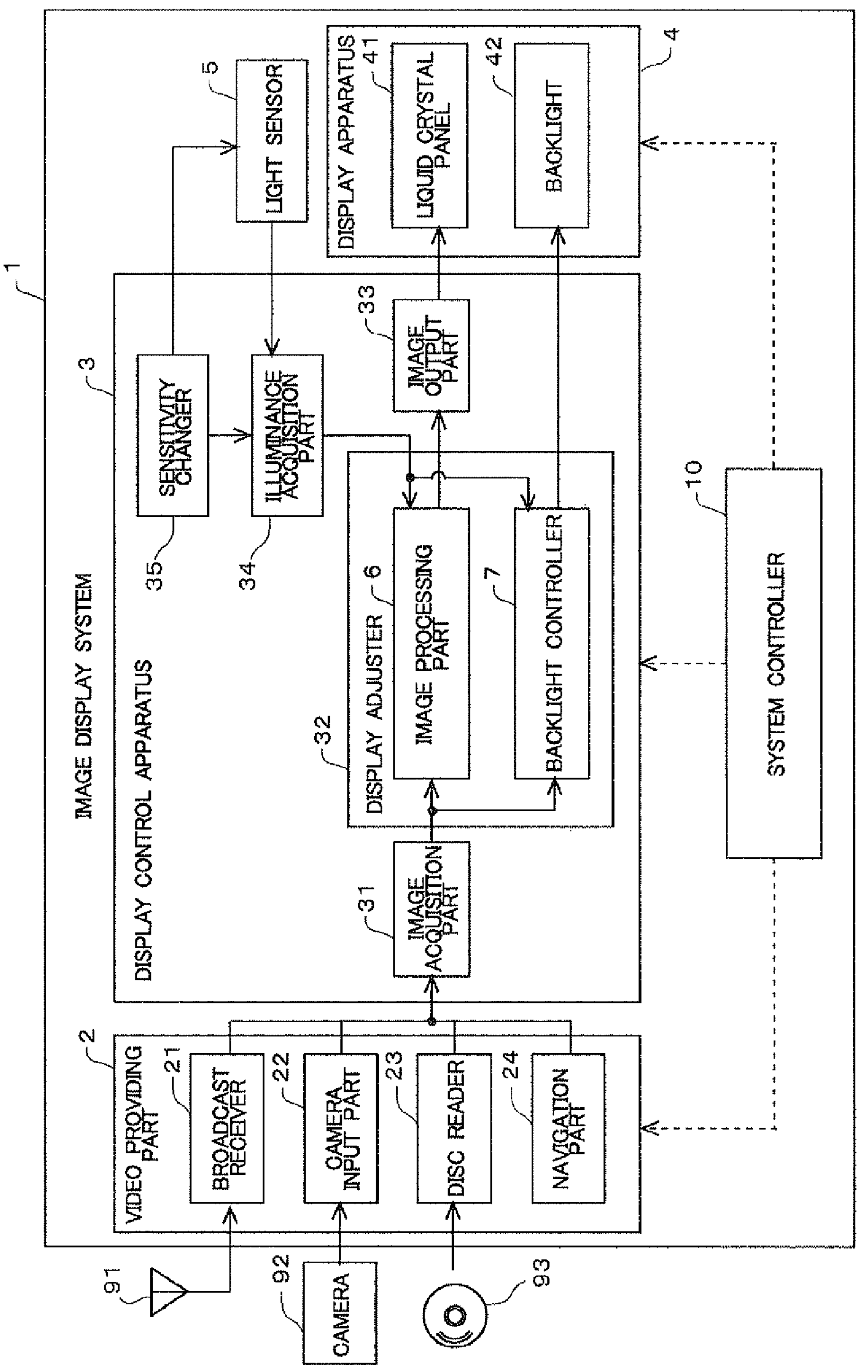
FIG. 1 is a block diagram illustrating a configuration of an image display system.

FIG. 1 is a block diagram illustrating a configuration of an image display system 1 in this embodiment. A navigation system for a vehicle, such as a car, is an example of the image display system 1. The image display system 1 for installation in a vehicle has a function of displaying various types of information for a user in a cabin of the vehicle.

As shown in FIG. 1, the image display system 1 includes a display apparatus 4 that displays various images, a display control apparatus 3 that controls a display of the display apparatus 4, and a video providing part 2 that provides an image to be displayed on the display apparatus 4.

The image display system 1 further includes a system controller 10 that controls the entire image display system 1. The system controller 10 is a microcomputer composed of, for example, a CPU, a RAM, a ROM and the like. Various control functions of controlling the entire system are implemented by arithmetic processing performed by the CPU of the system controller 10 in accordance with a predetermined program. The system controller 10 comprehensively controls behaviors of the video providing part 2, the display control apparatus 3, and the display apparatus 4.

The video providing part 2 outputs a video signal including a target display image to be displayed on the display apparatus 4, from various video sources. The video providing part 2 includes a broadcast receiver 21, a camera input part 22, a disc reader 23, and a navigation part 24. Each of the broadcast receiver 21, the camera input part 22, the disc reader 23, and the navigation part 24 included in the video providing part 2 outputs the video signal including an image (frame) in a predetermined-time cycle (e.g., 1/30 sec.).

The broadcast receiver 21 decodes a broadcast signal, such as television broadcast and data broadcast, received by an antenna 91 mounted on the vehicle, acquires an image representing a content of the broadcast received, and outputs the image acquired to the display control apparatus 3. The camera input part 22 is connected to a vehicle-mounted camera 92, acquires an image representing surroundings of the vehicle captured by the vehicle-mounted camera 92, and then outputs the image captured to the display control apparatus 3. The disc reader 23 reads a video disc 93 such as a DVD, acquires an image representing a content recorded on the video disc 93, and then outputs the image acquired to the display control apparatus 3. Moreover, the navigation part 24 is an electronic substrate that provides a navigation function and outputs an image, such as a map image for route guidance, necessary for the navigation function, to the display control apparatus 3.

The display apparatus 4 includes a liquid crystal panel 41 on which the image is displayed, and a backlight 42 that lights the liquid crystal panel 41. The image display system 1 is disposed on an instrument panel and the like in the vehicle such that the user that is a driver and/or a passenger of the vehicle can look at the liquid crystal panel 41 of the display apparatus 4. The liquid crystal panel 41 includes a plurality of dots arrayed in two dimensions of length and width. The liquid crystal panel 41 displays the image by changing a transmission of light for each dot. Moreover, the backlight 42 includes a light source such as a LED and lights the liquid crystal panel 41 from behind thereof.

The backlight 42 is operable to change an amount of light (light amount) of the light source. The backlight 42 receives a control signal (PWM signal) including a specified duty cycle, and adjusts the light amount of the light source in accordance with the duty cycle that the control signal represents. Concretely, the backlight 42 increases the light amount of the light source as the duty cycle becomes higher. The backlight 42 decreases the light amount of the light source as the duty cycle becomes lower. A screen of the display apparatus 4 becomes brighter as the light amount of the light source of the backlight 42 increases.

The display control apparatus 3 is a hardware circuit such as an ASIC (Application Specific Integrated Circuit), and controls the display of the display apparatus 4. The display control apparatus 3 includes a display adjuster 32 and an image output part 33.

An image acquisition part 31 acquires the video signal including an image, from the video providing part 2. The image acquisition part 31 makes switching among the broadcast receiver 21, the camera input part 22, the disc reader 23, or the navigation part 24 of the video providing part 2 based on a command from the system controller 10, receives one of the video signals output from the broadcast receiver 21, the camera input part 22, the disc reader 23, and the navigation part 24, and provides an image included in the video signal received to the display adjuster 32.

The display adjuster 32 adjusts a displaying state of the display apparatus 4 by adjusting the target display image to be displayed on the display apparatus 4 and the light amount of the backlight 42. The display adjuster 32 adjusts the displaying state of the display apparatus 4 according to information about illuminance by external light exerting an influence on visibility of the screen of the display apparatus 4.

The image output part 33 outputs the image adjusted by the display adjuster 32 to the display apparatus 4 and displays the image adjusted on the display apparatus 4. As a result, the image adjusted by the display adjuster 32 is displayed on the liquid crystal panel 41 of the display apparatus 4.

The display adjuster 32 is operable to perform two types of the adjustment control, which is a sunlight control and a dimmer control, for adjusting the displaying state of the display apparatus 4. The display adjuster 32 performs the sunlight control and the dimmer control selectively in accordance with the illuminance by the external light.

The sunlight control is one of the two types of the adjustment control and is performed when the illuminance by the external light is relatively high (e.g., higher than 500 lx), such as when direct sunlight is incident on the screen of the display apparatus 4. The sunlight control improves the visibility of the display apparatus 4 by improving quality of an image to be displayed on the display apparatus 4.

On the other hand, the dimmer control is the other type of the adjustment control performed when the illuminance by the external light is relatively low (e.g., less than 50 lx), such as at night. The dimmer control improves the visibility of the display apparatus 4 by adjusting brightness of the screen of the display apparatus 4.

The display adjuster 32 includes an image processing part 6 used to perform the sunlight control and a backlight controller 7 used to perform the dimmer control. The backlight controller 7 changes the light amount of the backlight 42 in accordance with the illuminance by the external light. The backlight controller 7 changes the light amount of the backlight 42 by outputting the control signal including the specified duty cycle to the backlight 42. The backlight controller 7 adjusts the light amount of the backlight 42 based on brightness of the target display image and the illuminance by the external light.

Figure 2:
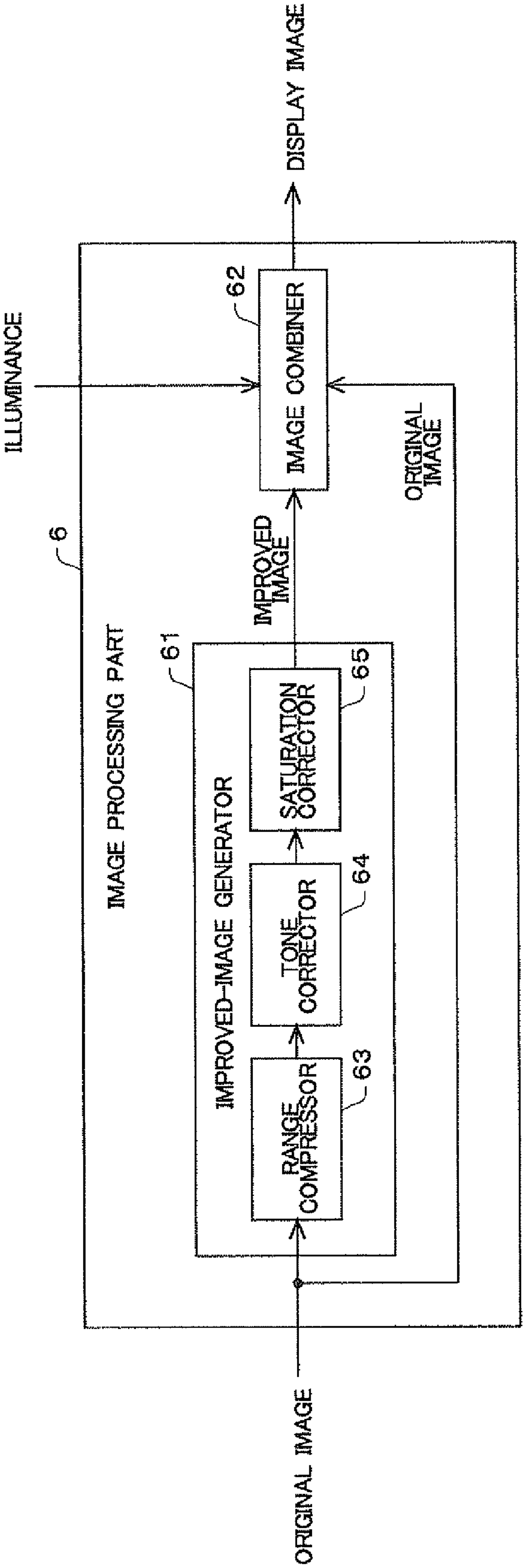
FIG. 2 illustrates a detailed configuration of an image processing part.

Moreover, the image processing part 6 corrects the target display image in accordance with the illuminance by the external light. FIG. 2 illustrates a detailed configuration of the image processing part 6. The image processing part 6 mainly includes an improved-image generator 61 and an image combiner 62.

The improved-image generator 61 implements predetermined image processing to an original image that is a pre-correction image input from the video providing part 2 and generates an improved image of which visibility is improved when the illuminance by the external light is relatively high. The improved-image generator 61 includes a range compressor 63, a tone corrector 64, and a saturation corrector 65. Detailed functions thereof are described later.

Moreover, the image combiner 62 generates a display image by combining the original image and the improved image generated by the improved-image generator 61, based on a combination ratio in accordance with the illuminance by the external light. The display image generated in such a manner is displayed on the display apparatus 4.

<1-2. Configuration Relating to Illuminance Acquisition>

As mentioned above, the display adjuster 32 adjusts the displaying state of the display apparatus 4 by selectively performing the sunlight control and the dimmer control, in accordance with the illuminance by the external light. As shown in FIG. 1, the image display system 1 includes a light sensor 5 as a component relating to acquiring the illuminance by the external light, and the display control apparatus 3 includes an illuminance acquisition part 34 and a sensitivity changer 35.

Figure 3:
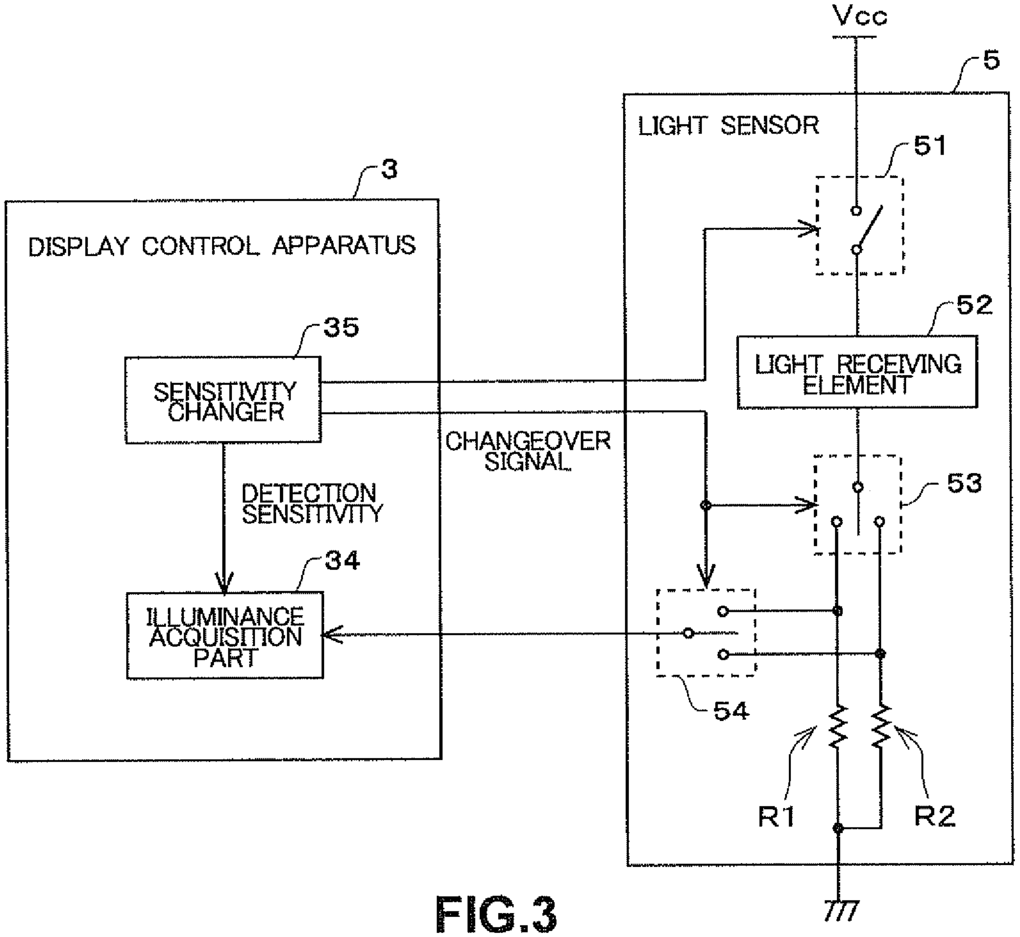
FIG. 3 illustrates a configuration relating to acquiring illuminance by external light in a first embodiment.

The light sensor 5 outputs a signal according to an intensity of the external light and to a detection sensitivity. The detection sensitivity of the light sensor 5 is switchable between two different set sensitivity modes ("low sensitivity" and "high sensitivity"). The illuminance acquisition part 34 acquires the illuminance by the external light based on a signal output from the light sensor 5. Moreover, the sensitivity changer 35 changes the detection sensitivity of the light sensor 5. FIG. 3 illustrates a detailed configuration relating to acquiring the illuminance by the external light in such a manner.

The light sensor 5 includes a light receiving element 52, such as a photodiode and a phototransistor. The light receiving element 52 is disposed in a vicinity of a rim portion of the liquid crystal panel 41 that is the screen of the display apparatus 4, and receives the external light incident on the screen of the display apparatus 4 (i.e., the external light exerting an influence on the visibility of the screen of the display apparatus 4). An upstream end of the light receiving element 52 is connected, via a switch 51, to a power supply line having a constant voltage Vcc, and power is supplied to the element 52 from the power supply line.

Moreover, a downstream end of the light receiving element 52 is connected, via a changeover switch 53, to a resistor R1 and a resistor R2. A first contact point of the changeover switch 53 is connected to the first resistor R1, and a second contact point of the changeover switch 53 is connected to the second resistor R2. A resistance value of the first resistor R1 is different from a resistance value of the second resistor R2, and the resistance value of the first resistor R1 is lower than the resistance value of the second resistor R2. The changeover switch 53 is operable to switch between the resistor R1 and the resistor R2 to connect one of the resistors R1 and R2 to the light receiving element 52.

Moreover, the light sensor 5 further includes a changeover switch 54 connected to the illuminance acquisition part 34. A first contact point of the changeover switch 54 is connected to an upstream end of the first resistor R1, and a second contact point of the changeover switch 54 is connected to an upstream end of the second resistor R2. Thus the changeover switch 54 is operable to switch between the upstream circuits of the first resistor R1 and the second resistor R2 to electrically connect one of the upstream circuits to the illuminance acquisition part 34.

When the first contact points of both the changeover switches 53 and 54 are closed, the light receiving element 52 is electrically connected to the first resistor R1, and a signal that represents a voltage of the upstream end of the first resistor R1 is output to the illuminance acquisition part 34. On the other hand, when the second contact points of both the changeover switches 53 and 54 are closed, the light receiving element 52 is electrically connected to the second resistor R2, and a signal that represents a voltage of the upstream side of the second resistor R2 is output to the illuminance acquisition part 34.

The detection sensitivity of the light sensor 5 can be changed by the switchover of the changeover switches 53 and 54. The light receiving element 52 outputs an electric current in accordance with the intensity of the incident external light. The electric current flows through the resistor connected to the downstream line of the light receiving element 52. Therefore, a signal representing higher voltage is output to the illuminance acquisition part 34 as the intensity of the incident external light increases.

In addition, the resistance value of the first resistor R1 is lower than the resistance value of the second resistor R2. Therefore, when the external light is incident on the light receiving element 52 at a certain intensity, in a case where the light receiving element 52 is connected to the first resistor R1, as compared to a case where the light receiving element 52 is connected to the second resistor R2, a signal representing a lower voltage is output to the illuminance acquisition part 34. As a result, when the light receiving element 52 is electrically connected to the first resistor R1, the detection sensitivity of the light sensor 5 is set to the "low sensitivity" that is a relatively low set sensitivity mode. In this case, since a signal voltage output from the light sensor 5 is relatively low, relatively high illuminance by the external light can be handled.

On the other hand, in a case where the light receiving element 52 is connected to the second resistor R2, as compared to a case where the light receiving element 52 is connected to the first resistor R1, the signal voltage output to the illuminance acquisition part 34 is higher. As a result, when the light receiving element 52 is electrically connected to the second resistor R2, the detection sensitivity of the light sensor 5 is set to the "high sensitivity" that is a relatively high set sensitivity mode. In this case, since the signal voltage output from the light sensor 5 is relatively high, relatively low illuminance by the external light can be handled.

The sensitivity changer 35 of the display control apparatus 3 is operable to alternate between the "low sensitivity" and the "high sensitivity" of the detection sensitivity of the light sensor 5 by outputting a changeover signal to switch the states of the changeover switch 53 and the changeover switch 54. Moreover, the sensitivity changer 35 outputs a signal representing the detection sensitivity of the light sensor 5 to the illuminance acquisition part 34. Furthermore, the sensitivity changer 35 is operable to supply and block electricity to the light receiving element 52 by outputting a signal to turn on/off the switch 51.

In addition, the illuminance acquisition part 34 of the display control apparatus 3 derives the illuminance by the external light, based on the signal voltage output from the light sensor 5 and on the detection sensitivity input from the sensitivity changer 35.

Figure 4:
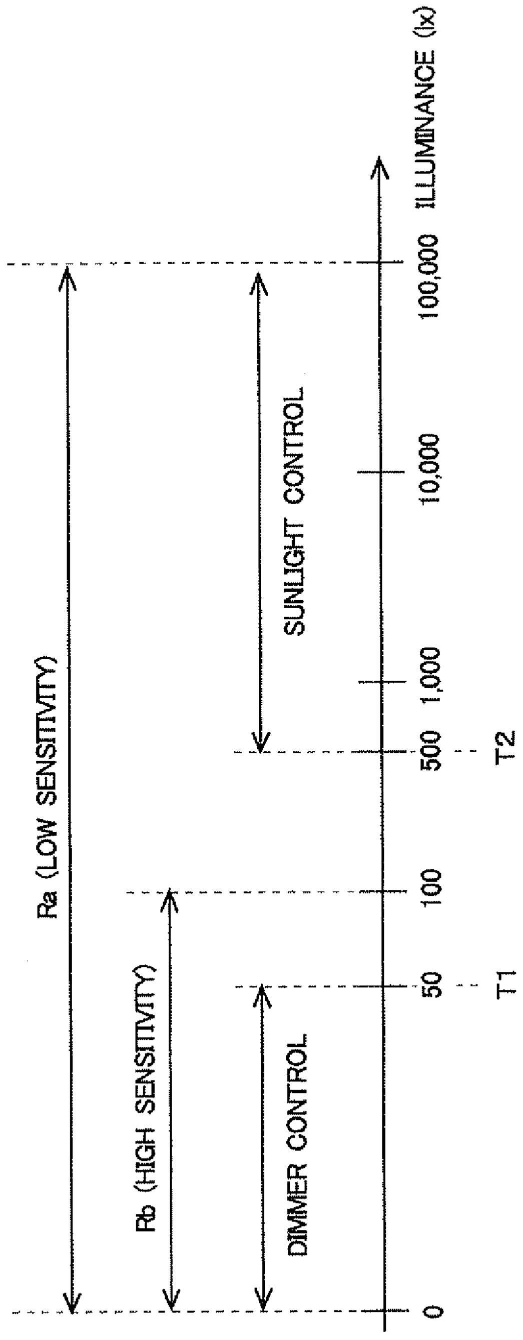
FIG. 4 illustrates a detection range for each of detection sensitivities of a light sensor.

As shown in FIG. 4, when the detection sensitivity of the light sensor 5 is set to the "low sensitivity," the illuminance acquisition part 34 acquires the illuminance by the external light in a detection range Ra from 0 to 100,000 lx. On the other hand, when the detection sensitivity of the light sensor 5 is set to the "high sensitivity," the illuminance acquisition part 34 acquires the illuminance by the external light in a detection range Rb from 0 to 100 lx. In FIG. 4, a horizontal axis representing the illuminance (lx) is logarithmic.

The illuminance acquisition part 34 derives the illuminance by the external light in, for example, an 8-bit (0 to 255) value. Thus when the detection sensitivity of the light sensor 5 is set at the "low sensitivity" but present illuminance by the external light is relatively low (e.g., less than 50 lx), the illuminance acquisition part 34 derives an underflow result. As a result, accurate illuminance by the external light cannot be acquired. Contrarily, when the detection sensitivity of the light sensor 5 is set at the "high sensitivity" but the present illuminance by the external light is relatively high (e.g., higher than 500 lx), the illuminance acquisition part 34 derives an overflow result. As a result, accurate illuminance by the external light cannot be acquired.

The display adjuster 32 performs the sunlight control and the dimmer control selectively in accordance with the illuminance by the external light acquired by the illuminance acquisition part 34. The display adjuster 32 performs the dimmer control when the illuminance by the external light acquired by the illuminance acquisition part 34 is lower than a predetermined first threshold T1. The first threshold T1 is set at a value equal to or smaller than a maximum value (100 lx) of the detection range Rb used for a case where the detection sensitivity is set in the "high sensitivity." The first threshold T1 is set, for example, at 50 lx in this embodiment.

Moreover, the display adjuster 32 performs the sunlight control when the illuminance by the external light acquired by the illuminance acquisition part 34 is higher than a predetermined second threshold T2 (T1<T2). The second threshold T2 is set to a value higher than the maximum value (100 lx) of the detection range Rb used for a case where the detection sensibility is set in the "high sensitivity." The second threshold T2 is set, for example, at 500 lx in this embodiment. The improved image generated in the sunlight control can be regarded as an image of which visibility is improved when the illuminance by the external light is higher than the second threshold T2.

<1-3. Displaying State Adjustment>

Next, control details of the dimmer control and the sunlight control are concretely described. First, the dimmer control performed when the illuminance by the external light is relatively low, is described. When the illuminance by the external light is relatively low, the screen of the display apparatus 4 is too bright for a user, as compared to the surrounding environment. Thus, the visibility of the screen of the display apparatus 4 is reduced.

Therefore, in the dimmer control, the backlight controller 7 makes the light amount of the backlight 42 lower than a standard light amount, in accordance with the illuminance by the external light. Thus the visibility of the screen of the display apparatus 4 is improved. The backlight controller 7 reduces the light amount (more concretely, duty cycle) of the backlight 42 as the illuminance by the external light becomes lower.

Figure 5:
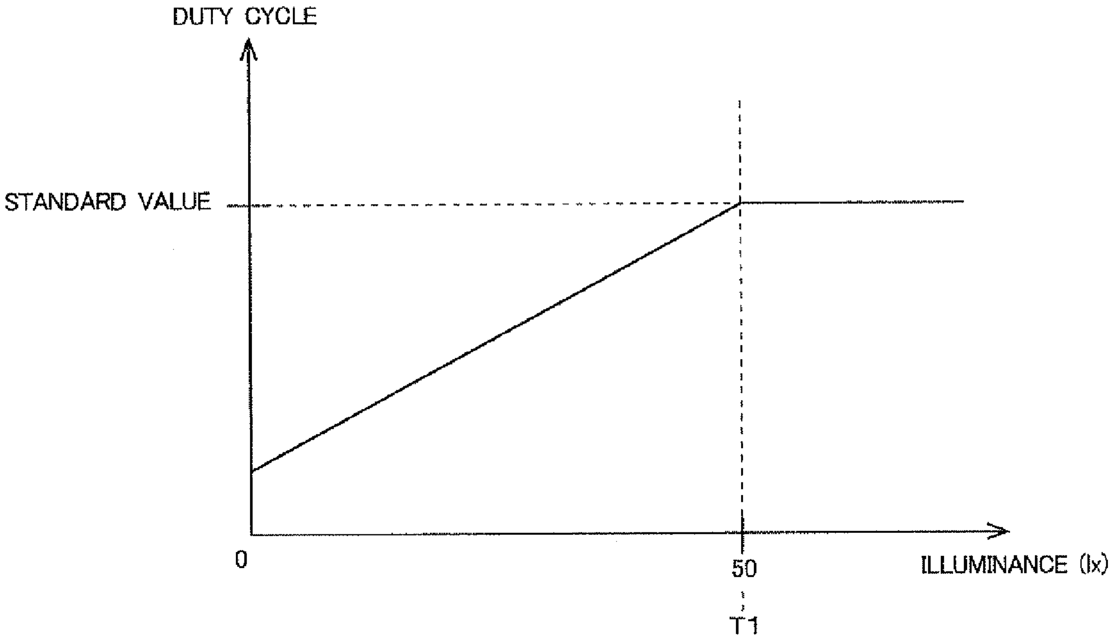
FIG. 5 illustrates a duty cycle in a dimmer control.

Concretely, as shown in FIG. 5, the backlight controller 7 sets the duty cycle in proportion to the illuminance by the external light when the illuminance by the external light is in a range from 0 to 50 lx. The maximum value of the duty cycle is a standard value corresponding to the standard light amount of the backlight 42. The backlight controller 7 sets the standard value at a value in a range from 0.2 to 0.8 in accordance with an averaged value of brightness of the target display image. The backlight controller 7 sets a greater standard value as the averaged value of the brightness of the target display image becomes greater. Moreover, when the illuminance by the external light is higher than the first threshold T1 of 50 lx, the dimmer control is not performed and the duty cycle remains at the standard value. For performing such a dimmer control, the illuminance by the external light needs to be acquired in the "high sensitivity" of the detection sensitivity of the light sensor 5.

Next, the sunlight control performed when the illuminance by the external light is relatively high, is described. When the illuminance by the external light is relatively high, a range of user-recognizable tone differentiation of an image displayed on the display apparatus 4 becomes narrower, for a reason such as reflection of the external light on the screen, and the tones of the image are substantially reduced, especially in a relatively low-bright area of the image. Moreover, colors of a subject in the image displayed on the display apparatus 4 become light entirely. Thus, the visibility of the screen of the display apparatus 4 decreases.

Therefore, in the sunlight control, the improved-image generator 61 (refer to FIG. 2) of the image processing part 6 compresses a dynamic range to express the tones in the range of the user-recognizable tone differentiation, and generates the improved image of which saturation has been enhanced to make the colors of the subject clear. Then the visibility of the screen of the display apparatus 4 is improved by displaying a display image obtained by combining the improved image generated and the original image.

The range compressor 63 of the improved-image generator 61 compresses the dynamic range of the original image. The range compressor 63 separates an illumination component (low frequency component) from a reflectance component (high frequency component) of the original image, and amplifies the reflectance component while suppressing the illumination component. Thus, the dynamic range is compressed and the tone differentiation becomes clear even in a very bright area and in a very dark area. As a result, the improved image of which visibility has been improved is obtained.

The tone corrector 64 corrects the tones of the improved image processed by the range compressor 63. Concretely, the tone corrector 64 corrects the tones of the improved image by using a predetermined tone curve, and increases brightness in a relatively low-bright area in which the tones may be reduced. Moreover, the saturation corrector 65 enhances the saturation of the improved image processed by the tone corrector 64. Thus the colors of the subject in the improved image become clear.

Figure 6:
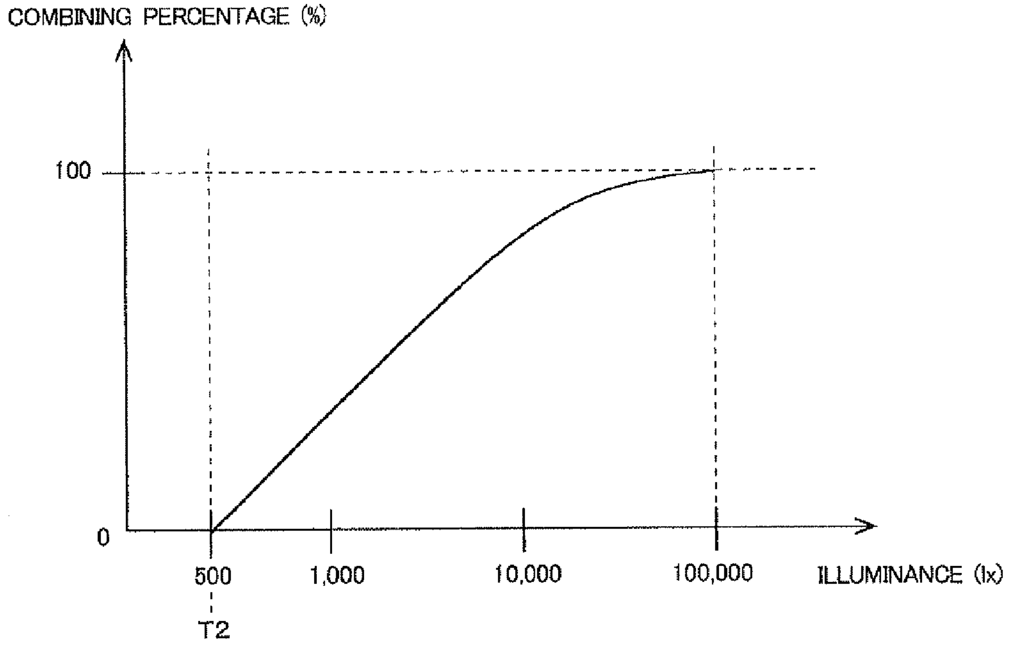
FIG. 6 illustrates a combining percentage of an improved image in a sunlight control.

The image combiner 62 generates the display image by combining the improved image generated in the manner mentioned above and the original image based on the combination ratio in accordance with the illuminance by the external light. The image combiner 62 increases a percentage (combining percentage) for which the improved image accounts in the display image as the illuminance by the external light becomes higher. Concretely, as shown in FIG. 6, when the illuminance by the external light is in a range from 500 to 100,000 lx, the image combiner 62 sets the combining percentage of the improved image higher as the illuminance by the external light becomes higher. The combining percentage of the improved image is set at 0% when the illuminance by the external light is the second threshold T2 of 500 lx. The combining percentage of the improved image is set at 100% when the illuminance by the external light is 100,000 lx that is the maximum value of the detection range Ra. For performing such a sunlight control, the illuminance by the external light needs to be acquired in the "low sensitivity" of the detection sensitivity of the light sensor 5.

<1-4. Change of Detection Sensitivity>

Next described is a method in which the sensitivity changer 35 changes the detection sensitivity of the light sensor 5. As mentioned earlier, the illuminance by the external light needs to be acquired in the "high sensitivity" for the dimmer control, and the illuminance by the external light needs to be acquired in the "low sensitivity" for the sunlight control. Therefore, it may be a possible option to switch the detection sensitivity in accordance with the illuminance by the external light. However, the possible option requires some time to acquire accurate illuminance by the external light when the illuminance by the external light changes significantly. Moreover, it takes time to select an adjustment control to be performed. Therefore, response performance to a change of the illuminance by the external light deteriorates in the adjustment control. Therefore, in this embodiment, the sensitivity changer 35 periodically alternates between the "low sensitivity" and the "high sensitivity" of the detection sensitivity of the light sensor 5.

Figure 7:
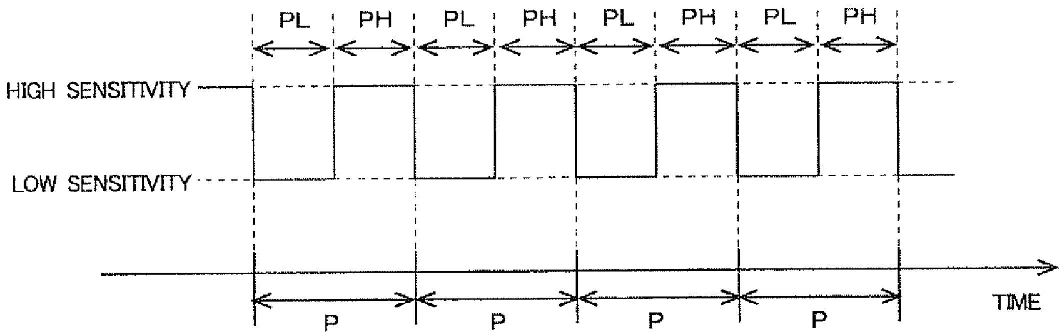
FIG. 7 illustrates a timing of changing a detection sensitivity.

Concretely, as shown in FIG. 7, the sensitivity changer 35 changes the detection sensitivity in a predetermined-time cycle P, and switches between the "low sensitivity" and the "high sensitivity" for the detection sensitivity in the cycle P. Thus the detection sensitivity of the light sensor 5 is set to the "low sensitivity" and to the "high sensitivity" alternately. The cycle P is set, for example, at 1/100 sec.

Since the detection sensitivity of the light sensor 5 is switched between the "low sensitivity" and the "high sensitivity" in the cycle P, the illuminance acquisition part 34 acquires the illuminance by the external light when the detection sensitivity is set to the "low sensitivity" and when the detection sensitivity is set to the "high sensitivity," in the cycle P. As a result, the illuminance acquisition part 34 acquires accurate illuminance by the external light in the cycle P regardless of present illuminance level of the external light. Therefore, even when the illuminance by the external light changes significantly, it is possible to acquire the accurate illuminance by the external light speedily. In this embodiment, a duration of a low sensitivity period PL in which the detection sensitivity is set to the "low sensitivity" is the same as a duration of a high sensitivity period PH. In other words, a ratio of the low sensitivity period PL to the high sensitivity period PH is 1:1 (5:5) in the cycle P.

<1-5. Process>

Next described are processes individually performed by the sensitivity changer 35, the illuminance acquisition part 34 and the display adjuster 32 of the image display system 1.

Figure 8:
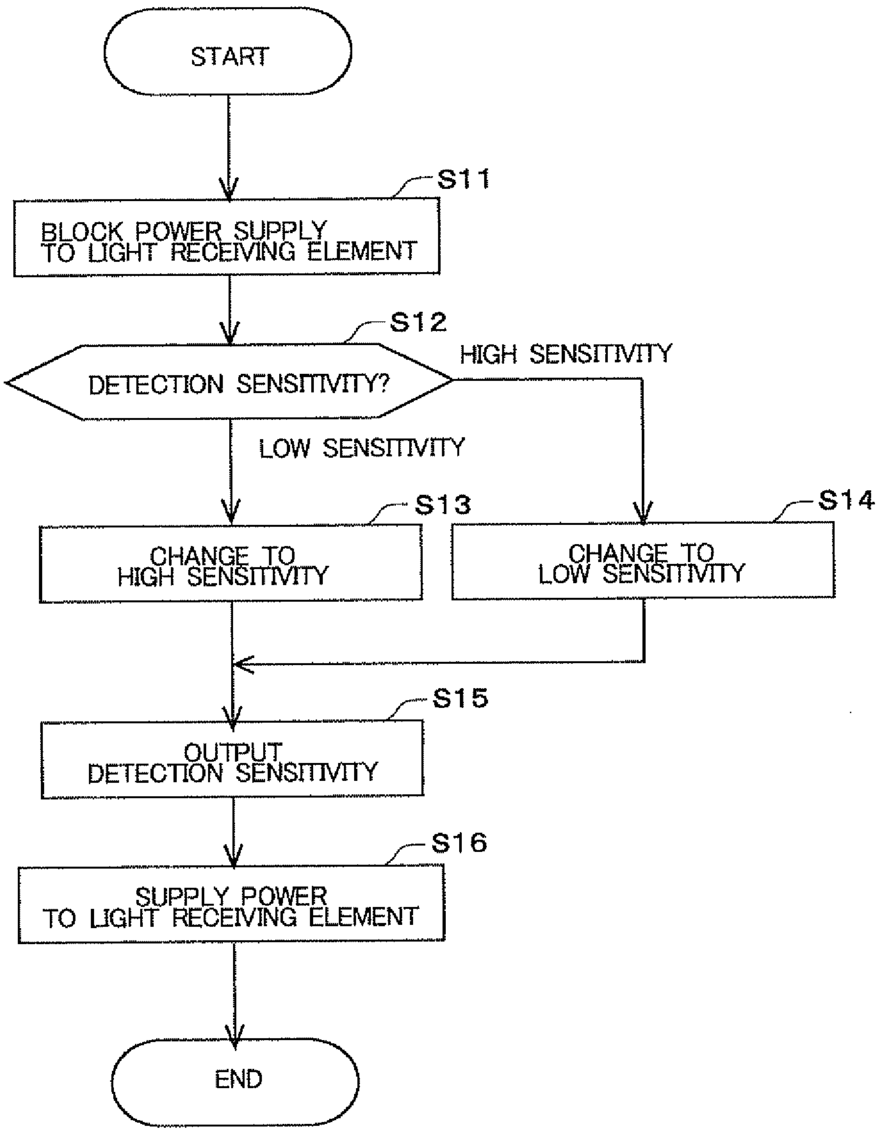
FIG. 8 illustrates a process performed by a sensitivity changer.

First, the process performed by the sensitivity changer 35 is described. FIG. 8 illustrates the process performed by the sensitivity changer 35. The sensitivity changer 35 performs the process shown in FIG. 8 in each switching timing when the detection sensitivity of the light sensor 5 needs to be switched over. Therefore, in this embodiment the process shown in FIG. 8 is performed repeatedly in one-half (1/200 sec.) of the cycle P (1/100 sec.).

The sensitivity changer 35 transmits a signal to the switch 51 to turn off the switch 51 at the switching timing. Thus power supply to the light receiving element 52 is blocked (a step S11).

Next, when the detection sensitivity is set at the "low sensitivity," the sensitivity changer 35 transmits the changeover signal to switch the changeover switches 53 and 54, and changes the detection sensitivity to the "high sensitivity" (a step S12 and a step S13). On the other hand, when the detection sensitivity is set at the "high sensitivity," the sensitivity changer 35 transmits the changeover signal to switch the changeover switches 53 and 54, and changes the detection sensitivity to the "low sensitivity" (the step S12 and a step S14).

When switching the detection sensitivity of the light sensor 5 in such a manner, the sensitivity changer 35 outputs a signal representing the detection sensitivity switched, to the illuminance acquisition part 34 (a step S15). Along with the output of the signal, the sensitivity changer 35 transmits a signal to the switch 51 to turn on the switch 51, and supplies electricity to the light receiving element 52. Thus a signal representing a voltage in accordance with the detection sensitivity switched is output to the illuminance acquisition part 34 (a step S16).

Figure 9:
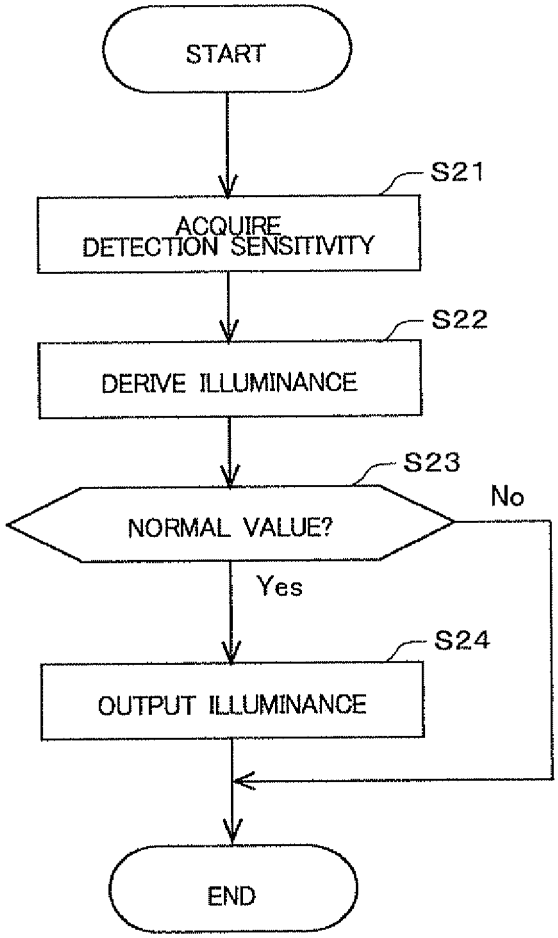
FIG. 9 illustrates a process performed by an illuminance acquisition part.

Next, the process performed by the illuminance acquisition part 34 is described. FIG. 9 illustrates the process performed by the illuminance acquisition part 34. The illuminance acquisition part 34 performs the process shown in FIG. 9 repeatedly in a cycle sufficiently shorter than the cycle P in which the sensitivity changer 35 changes the detection sensitivity. For example, the process shown in FIG. 9 is repeatedly performed in a one-tenth (1/1000 sec.) cycle of the cycle P (1/100 sec.).

The illuminance acquisition part 34 first acquires a present detection sensitivity of the light sensor 5 from the sensitivity changer 35 (a step S21). Next, the illuminance acquisition part 34 derives the illuminance by the external light based on the detection sensitivity and the voltage represented by the signal output from the light sensor 5. A relationship between the illuminance and the voltage represented by the signal output from the light sensor 5 is determined in advance based on a table or the like for each mode of the detection sensitivity (a step S 22).

Next, the illuminance acquisition part 34 determines whether or not a derivation result derived as the illuminance by the external light is a normal value. For example, the illuminance acquisition part 34 determines whether or not the derivation result is an abnormal value such as an overflow value and an underflow value (a step S23). When the derivation result is such an abnormal value, the detection sensitivity of the light sensor 5 is not set at the set sensitivity mode appropriate to the present illuminance by the external light. Therefore, in such a case (No in the step S23), the process ends here.

On the other hand, when the derivation result is a normal value, the illuminance acquisition part 34 outputs the derivation result as the illuminance by the external light to the display adjuster 32 (a step S24). The illuminance by the external light output to the display adjuster 32 is retained until the display adjuster 32 receives a next withal derivation result. Thus accurate illuminance by the external light is output from the illuminance acquisition part 34.

As mentioned earlier, the detection sensitivity of the light sensor 5 is switched to the "low sensitivity" and to the "high sensitivity" alternately in the cycle P. Therefore, even when the illuminance by the external light changes significantly, the illuminance acquisition part 34 is operable to acquire the accurate illuminance by the external light in the cycle P, and to output the accurate illuminance by the external light to the display adjuster 32.

Figure 10:
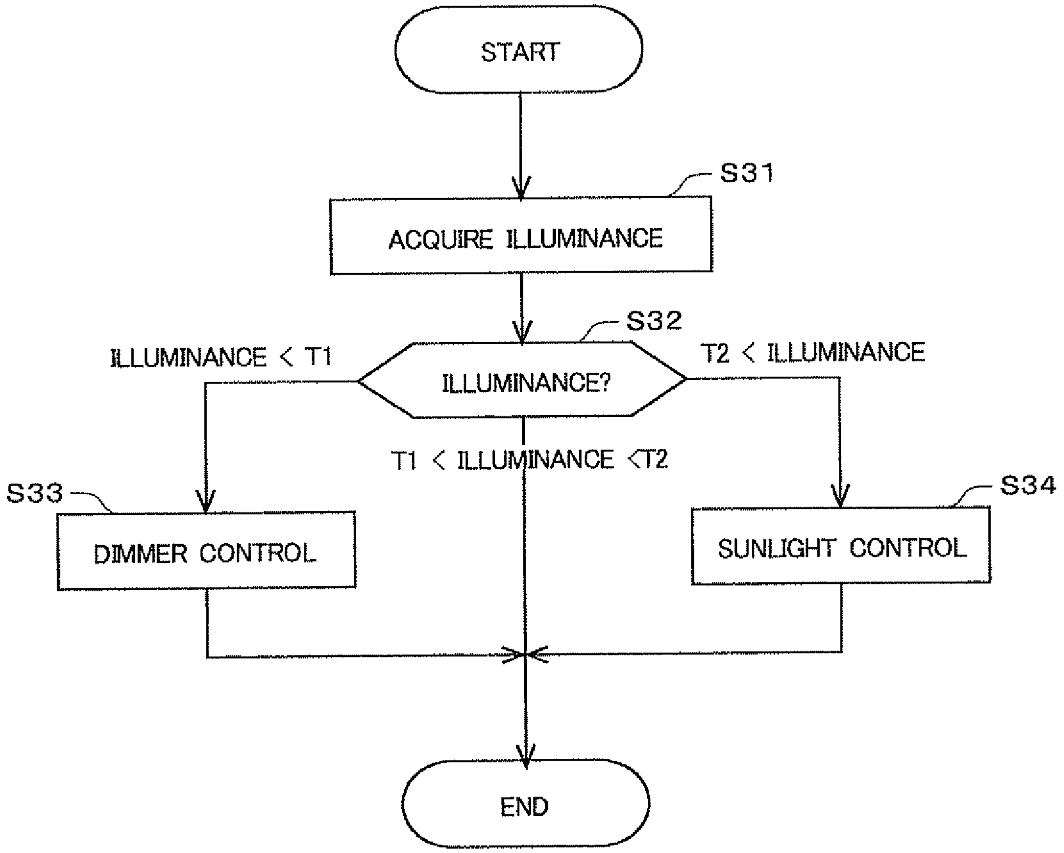
FIG. 10 illustrates a process performed by a display adjuster.

Next, the process performed by the display adjuster 32 is described. FIG. 10 illustrates the process performed by the display adjuster 32. The display adjuster 32 repeats the process shown in FIG. 10 each time when the target display image is input. For example, the process shown in FIG. 10 is repeated in a one-thirtieth second cycle in this embodiment.

The display adjuster 32 first acquires the illuminance by the external light from the illuminance acquisition part 34 (a step S31). Next, the display adjuster 32 compares the illuminance by the external light with the two thresholds T1 and T2 to select one type of the adjustment control (a step S32).

When the illuminance by the external light is lower than the first threshold T1 (50 lx), the display adjuster 32 selects the dimmer control as the adjustment control to be performed. Then the display adjuster 32 performs the dimmer control in accordance with the illuminance by the external light (a step S33).

On the other hand, when the illuminance by the external light is higher than the second threshold T2 (500 lx), the display adjuster 32 selects the sunlight control as the adjustment control to be performed. Then the display adjuster 32 performs the sunlight control in accordance with the illuminance by the external light (a step S34).

Moreover, when the illuminance by the external light is higher than the first threshold T1 and also is lower than the second threshold T2, the display adjuster 32 does not perform the adjustment control for adjusting the displaying state of the display apparatus 4. When the illuminance by the external light is the same as the first threshold T1 or as the second threshold T2, whether or not the applicable adjustment control is performed is optional.

Since the illuminance acquisition part 34 is operable to acquire the accurate illuminance by the external light in the cycle P, as mentioned earlier, even when the illuminance by the external light changes significantly, the display adjuster 32 is capable of speedily selecting and performing an appropriate type of the adjustment control in accordance with the illuminance by the external light. Therefore, even when the illuminance of the display apparatus 4 affected by the external light changes significantly and frequently, for example when bright light of street lights is intermittently incident on a display installed in a vehicle running at night, the displaying state of the display apparatus 4 can be appropriately adjusted speedily in response to the change of the illuminance by the external light. As a result, the visibility of the display apparatus 4 installed in the vehicle can be improved.

As mentioned above, in the image display system 1 in this embodiment, the light sensor 5 operable to change the detection sensitivity is provided. The light sensor 5 outputs the signal representing a voltage according to the detection sensitivity and the intensity of the external light exerting an influence on the screen of the display apparatus 4. The illuminance acquisition part 34 of the display control apparatus 3 acquires the illuminance by the external light based on the signal output from the light sensor 5. Moreover, the display adjuster 32 adjusts the displaying state of the display apparatus 4 in accordance with the illuminance by the external light acquired by the illuminance acquisition part 34. Then the sensitivity changer 35 periodically alternates between the "low sensitivity" of the detection sensitivity and the "high sensitivity" of the detection sensitivity of the light sensor 5. Thus even when the illuminance by the external light changes significantly, accurate illuminance by the external light can be acquired speedily. As a result, the response performance to a change of the illuminance by the external light can be improved in the adjustment control of the displaying state of the display apparatus 4.

Furthermore, the response performance to the change of the illuminance by the external light can be improved in the adjustment of the displaying state of the display apparatus 4 installed in a vehicle in which the illuminance by the external light incident is changeable. Thus the visibility of the display apparatus 4 can be improved.

In addition, when the sunlight control for the relatively high illuminance by the external light and the dimmer control for the relatively low illuminance by the external light are selectively performed based on the illuminance by the external light, the accurate illuminance by the external light can be speedily acquired. Therefore, the image display system 1 is operable to speedily select and perform an appropriate type of the adjustment control in accordance with the illuminance by the external light.

<2. Second Embodiment>

Next, a second embodiment is described. A configuration and a process of an image display system 1 in the second embodiment are substantially the same as the image display system 1 in the first embodiment. Therefore, points different from the first embodiment are hereinafter mainly described. In the first embodiment, the ratio of the low sensitivity period PL to the high sensitivity period PH in the cycle P is fixed at 5:5 (refer to FIG. 7). On the other hand, in the second embodiment, a ratio of a low sensitivity period PL to a high sensitivity period PH in a cycle P is changed.

Figure 11:
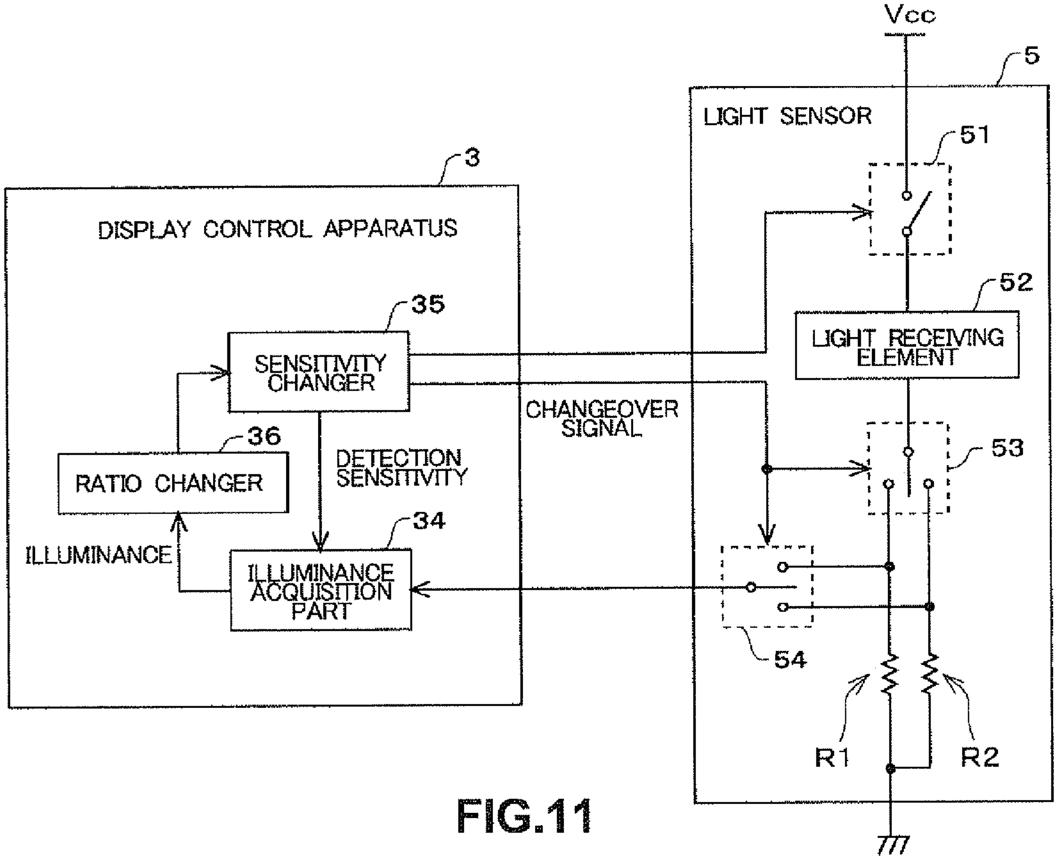
FIG. 11 illustrates a configuration relating to acquiring illuminance by external light in a second embodiment.

FIG. 11 illustrates a configuration, of the image display system 1, relating to acquiring illuminance by external light in the second embodiment. A display control apparatus 3 in the second embodiment further includes a ratio changer 36 in addition to the configuration of the display control apparatus 3 (refer to FIG. 3) in the first embodiment. The ratio changer 36 changes the ratio of the low sensitivity period PL to the high sensitivity period PH in the cycle P.

Figure 12:
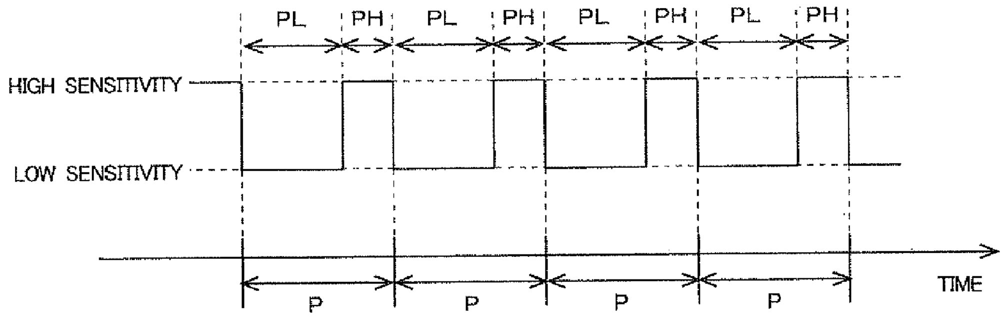
FIG. 12 illustrates a timing of changing the detection sensitivity.
Figure 13:
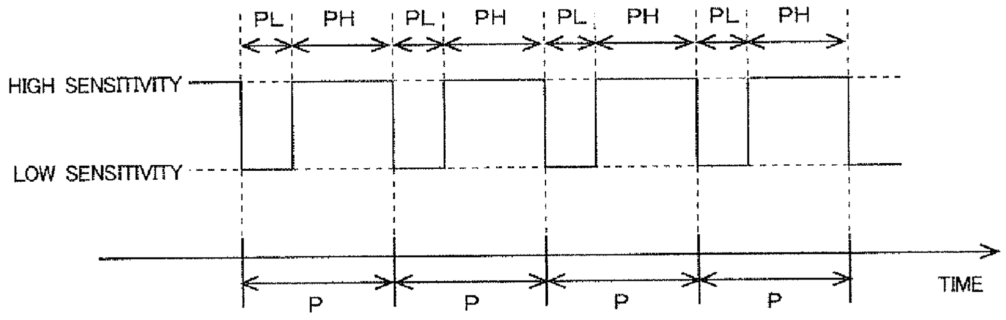
FIG. 13 illustrates a timing of changing the detection sensitivity.

A sensitivity changer 35 alternates between a "low sensitivity" of a detection sensitivity and a "high sensitivity" of the detection sensitivity of a light sensor 5 in a switching timing based on the ratio changed by the ratio changer 36. Thus, a percentage of the low sensitivity period PL in the cycle P can be increased, for example, as shown in FIG. 12. Contrarily, as shown in FIG. 13, a percentage of the high sensitivity period PH in the cycle P can be increased.

Figure 14:
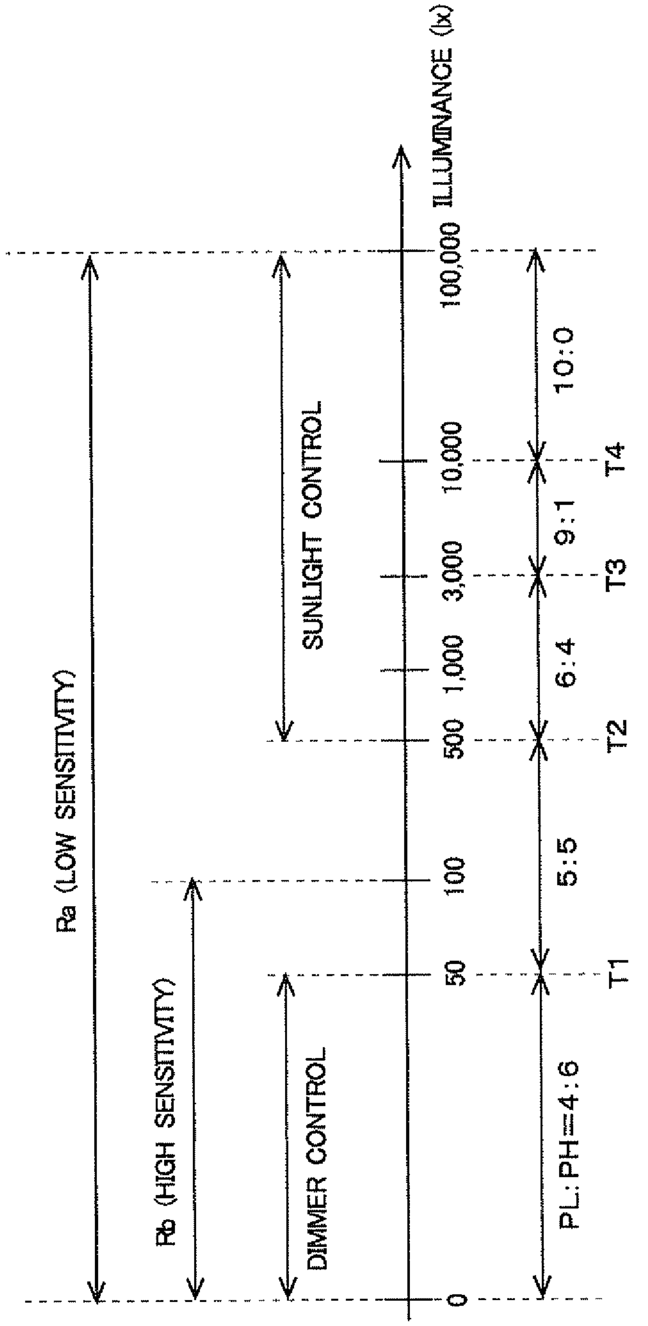
FIG. 14 illustrates a relationship between a ratio of a low sensitivity period to a high sensitivity period and the illuminance by the external light.

The ratio changer 36 changes the ratio of the low sensitivity period PL to the high sensitivity period PH in accordance with the illuminance by the external light acquired by an illuminance acquisition part 34. FIG. 14 illustrates a relationship between the ratio of the low sensitivity period PL to the high sensitivity period PH and the illuminance by the external light. In FIG. 14, a horizontal axis representing the illuminance (lx) is logarithmic.

In the second embodiment, in addition to a first threshold T1 and a second threshold T2, a third threshold T3 and a fourth threshold T4 are provided as thresholds for the illuminance by the external light. The third threshold T3 and the fourth threshold T4 (T3<T4) are higher than the second threshold T2, and the third threshold T3 and the fourth threshold T4 are set at values smaller than a maximum value (100,000 lx) of a detection range Ra used for a case Where the detection sensitivity is set in the "low sensitivity." The third threshold T3 and the fourth threshold T4 are set at, for example, 3,000 lx and at 10,000 lx respectively in this embodiment.

The ratio changer 36 increases the percentage of the low sensitivity period PL in the cycle P as the illuminance by the external light becomes higher. Contrarily, the ratio changer 36 increases the percentage of the high sensitivity period PH in the cycle P as the illuminance by the external light becomes lower.

Concretely, the ratio changer 36 sets the ratio of the low sensitivity period PL to the high sensitivity period PH to 4:6 (PL:PH=4:6) when the illuminance by the external light is lower than the first threshold T1. Moreover, the ratio changer 36 sets the ratio of the low sensitivity period PL to the high sensitivity period PH to 5:5 (PL:PH=5:5) when the illuminance by the external light is higher than the first threshold T1 but lower than the second threshold T2. Furthermore, the ratio changer 36 sets the ratio of the low sensitivity period PL to the high sensitivity period PH to 6:4 (PL:PH=6:4) when the illuminance by the external light is higher than the second threshold T2 but lower than the third threshold T3. In addition, the ratio changer 36 sets the ratio of the low sensitivity period PL to the high sensitivity period PH to 9:1 (PL:PH=9:1) when the illuminance by the external light is higher than the third threshold. T3 but lower than the fourth threshold T4. The ratio changer 36 sets the ratio of the low sensitivity period PL to the high sensitivity period PH to 10:0 (PL:PH-10:0) when the illuminance by the external light is higher than the fourth threshold T4.

There is a possibility that the illuminance by the external light incident on the screen of a display apparatus 4 changes significantly. However, such a significant change occurs less frequently than the relatively stable state of the illuminance. Therefore, as shown in FIG. 14, a necessary adjustment control can be stably performed based on present illuminance by the external light by changing the ratio of the low sensitivity period PL to the high sensitivity period in accordance with the present illuminance by the external light. As a result, response performance to a relatively small change not requiring a change of the type of the adjustment control, can be improved in the adjustment control.

For example, in the dimmer control (illuminance<the first threshold T1), the high sensitivity period PH in which the detection sensitivity is set at the "high sensitivity" for the dimmer control is set longer. Thus the dimmer control can be stably performed, and the response performance in the dimmer control can be improved. Moreover, in the sunlight control (the second threshold T2<illuminance), the low sensitivity period PL in which the detection sensitivity is set at the "low sensitivity" for the sunlight control is set longer. Thus the sunlight control can be stably performed, and the response performance in the sunlight control can be improved.

Even when changing the ratio of the low sensitivity period PL to the high sensitivity period, like the first embodiment, the detection sensitivity of the light sensor 5 is switched between the "low sensitivity" and the "high sensitivity" in the cycle P. Therefore, since the illuminance acquisition part 34 is operable to acquire the accurate illuminance by the external light in the cycle P, even when the illuminance by the external light changes significantly, the display adjuster 32 is capable of speedily selecting and performing an appropriate type of the adjustment control.

Moreover, when the illuminance by the external light is higher than the third threshold T3, it is considered that direct sunlight is incident on the screen of the display apparatus 4. In such a case, the illuminance by the external light is relatively stable, and there is a little possibility that the dimmer control needs to be performed because the illuminance by the external light suddenly falls lower than the first threshold T1. Therefore, the response performance in the sunlight control can be improved because the high sensitivity period PH in the cycle P is set to a significantly small percentage.

Figure 15:
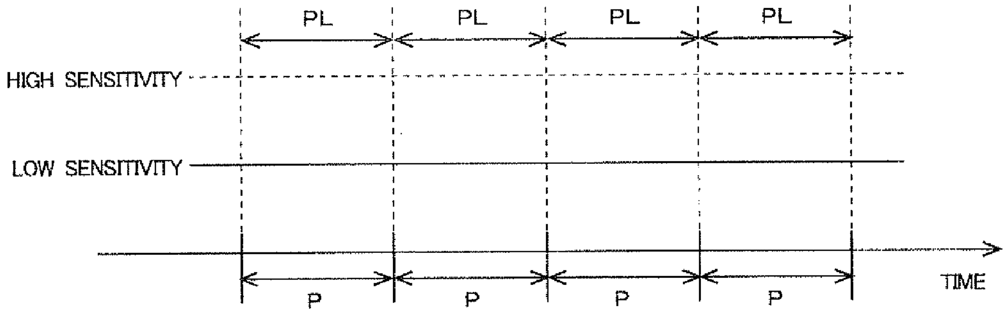
FIG. 15 illustrates a timing of changing the detection sensitivity.

Furthermore, when the illuminance by the external light is higher than the fourth threshold T4, it is considered that the illuminance by the external light becomes so stable that it is rare that the illuminance by the external light suddenly falls lower than the first threshold T1 and that the dimmer control needs to be performed. Therefore, the response performance in the sunlight control can be further improved because the low sensitivity period PL is set to the entire cycle P, as shown in FIG. 15.

As mentioned above, in the image display system 1 in this embodiment, the ratio changer 36 changes the ratio of the low sensitivity period PL to the high sensitivity period PH in the cycle P in accordance with the illuminance by the external light. Therefore, the adjustment control that adjusts the displaying state of the display apparatus 4 can be stably performed. As a result, the response performance to relatively small change of the illuminance by the external light can be improved in the adjustment control.

<3. Modification>

As mentioned above, the embodiments of the invention are described. However, the invention is not limited to the embodiments but various modifications are possible. Such modifications are hereinafter described. All modes including the aforementioned embodiments and modifications described below may be optionally combined with another.

In the aforementioned embodiments, the two switchable set sensitivity modes of the "low sensitivity" and the "high sensitivity" are provided as the detection sensitivity of the light sensor 5. However, different three or more set sensitivity modes may be provided as the detection sensitivity. Also in a case where the three or more set sensitivity modes are provided, the detection sensitivity of the light sensor 5 may be switched among the three or more set sensitivity modes in a cycle.

Moreover, in the aforementioned embodiments, the detection sensitivity of the light sensor 5 is changed by changing a resistor connected to the light receiving element 52. However, the detection sensitivity of the light sensor 5 may be changed by another method such as a method that adjusts a light amount incident on the light receiving element 52. For example, the detection sensitivity of the light sensor 5 may be changed by providing a liquid crystal shutter to a light receiving surface of the light receiving element 52 and by changing a light transmittance of the liquid crystal shutter. Furthermore, the detection sensitivity of the light sensor 5 may be changed by providing a plurality of movable filters to a vicinity of the light receiving element 52 and by changing a type or the number of the movable filters moved to the light receiving surface of the light receiving element 52.

In addition, in the second embodiment, the ratio of the low sensitivity period PL to the high sensitivity period PH is determined based on the relationship between the illuminance by the external light and the thresholds. However, the ratio of the low sensitivity period PL to the high sensitivity period PH may be determined based on a formula using the illuminance by the external light as a variable, a table, or the like, without using a threshold.

In the aforementioned embodiments, the image display system 1 for being installed in a vehicle is described. However, the invention described in the aforementioned embodiments are appropriately applicable to any image display system, such as a mobile phone and a smartphone, which is used in the environment under various types of the external light.

In the aforementioned embodiments, a part of functions implemented by a hardware circuit may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. A display control apparatus that controls a display of a display apparatus, the display control apparatus comprising:

an acquisition part that acquires information about illuminance by external light on a screen of the display apparatus based on a signal output from a detector that ouputs the signal according to an intensity of the external light and a detection sensitivity of the detector;

an adjuster that adjusts a displaying state of the display apparatus in accordance with the acquired information about the illuminance by the external light; and a sensitivity changer that changes the detection sensitivity of the detector to each of a plurality of set sensitivity modes that are different from one another during each of repeating time periods at regular intervals.

2. The display control apparatus according to claim 1, wherein the sensitivity changer alternates between a relatively low set sensitivity mode of the detection sensitivity and a relatively high set sensitivity mode of the detection sensitivity in one cycle.

3. The display control apparatus according to claim 2, further comprising a ratio changer that changes a ratio of a low sensitivity period of each of the repeating time periods in which the detection sensitivity is set in the relatively low set sensitivity mode to a high sensitivity period of each of the repeating time periods in which the detection sensitivity is set in the relatively high set sensitivity mode, in accordance with the acquired information about the illuminance by the external light.

4. The display control apparatus according to claim 3, wherein the ratio changer increases:

a percentage of the low sensitivity period as the illuminance by the external light becomes higher; and a percentage of the high sensitivity period as the illuminance by the external light becomes lower.

5. The display control apparatus according to claim 4, wherein the ratio changer sets the low sensitivity period to an entire period of the one cycle when the illuminance by the external light is higher than a predetermined threshold.

6. The display control apparatus according to claim 2, wherein the adjuster selectively performs, based on the illuminance by the external light:

a first control for a case where the illuminance by the external light is relatively high; and a second control for a case where the illuminance by the external light is relatively low.

7. The display control apparatus according to claim 1, wherein the display apparatus is an apparatus for installation in a vehicle.

8. An image display system comprising:

a display apparatus that displays an image;

an acquisition part that acquires information about illuminance by external light on a screen of the display apparatus based on a signal output from a detector that outputs the signal according to an intensity of the external light and a detection sensitivity of the detector;

an adjuster that adjusts a displaying state of the display apparatus in accordance with the acquired information about the illuminance by the external light; and a sensitivity changer that changes the detection sensitivity of the detector to each of a plurality of set sensitivity modes that are different from one another during each of repeating time periods at regular intervals.

9. The image display system according to claim 8, wherein the sensitivity changer alternates between a relatively low set sensitivity mode of the detection sensitivity and a relatively high set sensitivity mode of the detection sensitivity in one cycle.

10. The image display system according to claim 9, further comprising a ratio changer that changes a ratio of a low sensitivity period of each of the repeating time periods in which the detection sensitivity is set in the relatively low set sensitivity mode to a high sensitivity period of each of the repeating time periods in which the detection sensitivity is set in the relatively high set sensitivity mode, in accordance with the acquired information about the illuminance by the external light.

11. The image display system according to claim 10, wherein the ratio changer increases:

a percentage of the low sensitivity period as the illuminance by the external light becomes higher; and a percentage of the high sensitivity period as the illuminance by the external light becomes lower.

12. The image display system according to claim 11, wherein the ratio changer sets the low sensitivity period to an entire period of the one cycle when the illuminance by the external light is higher than a predetermined threshold.

13. The image display system according to claim 9, wherein the adjuster selectively performs, based on the illuminance by the external light, a first control for a case where the illuminance by the external light is relatively high; and a second control for a case where the illuminance by the external light is relatively low.

14. The image display system according to claim 8, wherein the display apparatus is an apparatus for installation in a vehicle.

15. A display control method of controlling a display of a display apparatus, the display control method comprising the steps of:

(a) acquiring information about illuminance by external light on a screen of the display apparatus based on a signal output from a detector that outputs the signal according to an intensity of the external light and a detection sensitivity of the detector;

(b) adjusting a displaying state of the display apparatus in accordance with the acquired information about the illuminance by the external light; and (c) changing the detection sensitivity of the detector to each of a plurality of set sensitivity modes that are different from one another during each of repeating time periods at regular intervals.

16. The display control method according to claim 15, wherein the step (c) alternates between a relatively low set sensitivity of the detection sensitivity and a relatively high set sensitivity of the detection sensitivity in one cycle.

17. The display control method according to claim 16, further comprising the step of (d) changing a ratio of a low sensitivity period of each of the repeating time periods in which the detection sensitivity is set in the relatively low set sensitivity mode to a high sensitivity period of each of the repeating time periods in which the detection sensitivity is set in the relatively high set sensitivity mode, in accordance with the acquired information about the illuminance by the external light.

18. The display control method according to claim 17, wherein the step (d) increases:

a percentage of the low sensitivity period as the illuminance by the external light becomes higher; and a percentage of the high sensitivity period as the illuminance by the external light becomes lower.

19. The display control method according to claim 18, wherein the step (d) sets the low sensitivity period to an entire period of the one cycle when the illuminance by the external light is higher than a predetermined threshold.

20. The display control method according to claim 16, wherein the step (b) selectively performs, based on the illuminance by the external light:

a first control for a case where the illuminance by the external light is relatively high; and a second control for a case where the illuminance by the external light is relatively low.

* * * * *